United States Patent [19]

König et al.

[11] Patent Number: 4,732,472

[45] Date of Patent: Mar. 22, 1988

[54] METHODS OF, AND SYSTEMS FOR, DETERMINING THE POSITION OF AN OBJECT

[75] Inventors: Johannes König; Wilhelm Kurfürst, both of Munich; Hans-Günther Willers, Karlsfeld; Martin Reuter, Munich, all of Fed. Rep. of Germany

[73] Assignee: Gewerkschaft Eisenhutte Westfalia, Lunon, Fed. Rep. of Germany

[21] Appl. No.: 699,880

[22] Filed: Feb. 8, 1985

[30] Foreign Application Priority Data

Feb. 9, 1984 [DE] Fed. Rep. of Germany ....... 3404495

[51] Int. Cl.⁴ .................. G01B 1/26; G01C 1/00; G01C 3/08; G01C 3/00
[52] U.S. Cl. ..................................... 356/152; 356/4; 356/5
[58] Field of Search ................ 356/152, 141; 1/4, 5

[56] References Cited

U.S. PATENT DOCUMENTS

| | | | |
|---|---|---|---|
| 2,982,859 | 5/1961 | Steinbrecher | 250/203 R X |
| 3,552,857 | 1/1971 | Hock et al. | 356/152 |
| 3,680,958 | 8/1972 | Von Bose | 356/141 X |
| 4,352,556 | 10/1982 | Haefliger et al. | 356/1 |
| 4,402,603 | 9/1983 | Lill | 356/152 |
| 4,538,907 | 9/1985 | Rocchi | 356/1 |
| 4,666,300 | 5/1987 | Zollman et al. | 356/141 |

FOREIGN PATENT DOCUMENTS

| | | |
|---|---|---|
| 2101742 | 1/1983 | United Kingdom ............. 356/152 |
| 0007886 | 6/1979 | European Pat. Off. |
| 0016297 | 1/1980 | European Pat. Off. |
| 2427816 | 2/1976 | Fed. Rep. of Germany |
| 991892 | 5/1961 | United Kingdom. |
| 115709 | 6/1966 | United Kingdom. |
| 1342875 | 10/1972 | United Kingdom. |
| 1381157 | 8/1972 | United Kingdom. |
| 1496760 | 9/1973 | United Kingdom. |
| 1477974 | 4/1975 | United Kingdom. |
| 1583675 | 7/1977 | United Kingdom. |
| 2019155 | 2/1979 | United Kingdom. |
| 2090096 | 5/1982 | United Kingdom. |
| 2119833 | 6/1982 | United Kingdom. |
| 8200196 | of 1982 | World Int Prop. O |

Primary Examiner—Stephen C. Buczinski
Assistant Examiner—Melissa L. Koltak
Attorney, Agent, or Firm—Sughrue, Mion, Zinn, Macpeak and Seas

[57] ABSTRACT

A system serves to establish the spatial position of an object automatically. The system uses a computer-controlled lasar beam scanning technique to locate the three-dimensional positions of mirror devices in successive measuring stations spaced from the object.

26 Claims, 11 Drawing Figures

METHODS OF, AND SYSTEMS FOR, DETERMINING THE POSITION OF AN OBJECT

FIELD OF THE INVENTION

The invention relates to a method of, and a system for determining the spatial position of an object.

BACKGROUND TO THE INVENTION

It is known to use a fixed light beam created by a laser which serves as a reference to locate the position of an object. Since the laser beam is fixed in three-dimensions, it accordingly supplies information on only one direction and a determination of the space coordinates of a measured point or object is not possible. More especially a continuous survey of the distance between the laser and the measured point and accordingly a three-dimensional location of the measured point cannot be achieved.

On the basis of the traverse survey method known for geodetic purposes, the invention is based upon the problem of producing a method and system suitable for location of an object with sufficient accuracy for many technical applications which can carry out this task automatically and, if desired, in a continuous manner. The invention is further directed to novel devices which can be used with special advantage with the method according to the invention and its system.

SUMMARY OF THE INVENTION

In its broadest aspect, the invention provides a method of determining the position of an object by traverse survey measurements utilizing one or more computer-controlled energy beams representing measurement vectors.

The invention also provides a method of determining the position of an object; said method comprising providing a energy beam from a reference station, displacing said beam in a controlled manner, detecting reflection of the beam from another station associated with the object and determining the spatial position of the other station utilizing data provided by the reference station. The energy beam can be a laser beam. The method can be used with special advantage for the determination of the three-dimensional co-ordinates of an implement or the like moving in three dimensions, which can be a machine, a machine part or a mechanical apparatus, as for example a driving or winning machine or a driving shield for driving tunnels or roadways, or the like. The method renders possible a simple, reliable, automatic and if desired also continuous determination of position by survey of the object under investigation even over great distances. In operation the co-ordinates of the object defining a measured point can be determined continuously in relation to the co-ordinate system of a reference point of know position. The traverse measurement will in general be carried out over at least two auxiliary points, forming polygon points, of which the first point of the traverse forms the reference point of known three-dimensional position, which can be arranged at a relatively great distance from the measured point. In the execution of the survey then, starting from the reference point, the relative position of the co-ordinate systems of the individual auxiliary points can be determined in succession under computer control, using conventional measuring means, such as angle-measuring instruments, and from the values thus obtained the actual position of the measured point in each case is ascertained by means of a computer. The relative positions of the co-ordinate systems of two successive points in the traverse can be determined unambiguously in known manner by co-ordinate transformation in dependence upon six linearly independent variables.

The laser meaurement sections are preferably defined by reflection of a laser beam back to a starting point. If is further advisable to transmit the ascertained measurement data over the laser measurement sections by modulation of the laser beams, from one auxiliary point to the next. The determination of the co-ordinates of the auxiliary points of the traverse expediently is effected by angle measurement in combination with a measurement of the distances between the auxiliary points, that is the lengths of the polygon sides. The length measurement can be carried out in a simple and reliable manner by transit time measurement of the laser beam between the auxiliary points. A central computer receives all the information as to the relative co-ordinates of the sections of the traverse and their directions and calculates the actual position of the measured point or object in each case from this information.

In the automatic survey, each polygon point of the traverse expediently forms a computer-controlled subsystem, that is a measuring station with its own computer (microprocessor) for the detection and transmission of the measured three-dimensional data. In this case, as mentioned, starting from a reference point situated at the starting point of the traverse, the relative positions of the co-ordinate systems of the polygon points are successively ascertained under computer control, and the actual position in each case of the measured point is ascertained, from the values thus obtained, by means of the central computer.

The invention also provides a system for determining the position of an object; said system comprising a reference station, the position of which is pre-determined, remote from the object, at least one other station associated with the object, the other station employing energy reflective means and the reference station employing means for providing a energy beam, means for displacing the energy beam in a controlled manner, means for detecting energy reflected by the other station indicative of its position and means for providing data signifying the spatial position of the other station.

As appears hereinafter several auxiliary stations are preferably interposed between the reference station and the other station. The stations preferably communicate with laser beams and computers in the stations provide data signifying their relative positions to a central computer which evaluates the spatial co-ordinate of the object.

The distance between stations linked by a double-path laser beam can be determined by measurement of the transit time of the laser beam and its reflection.

The measurement stations can be mounted for controlled angular movement about horizontal and vertical axes.

As appears hereinafter a computer-controlled displaceable laser arranged at the relevant measurement station can find the bearing of a passive triple-mirror device at another station which reflects the laser beam. As is known a triple-mirror possesses the property of always reflecting a light beam parallel to itself. The parallel offset of the reflected light beam is thus proportional to the distance of the incident laser beam from the centre of the triple-mirror and a zero parallel offset signifies the centre of the triple-mirror has been located. In this way the beam can be angularly orientated to exactly locate to the triple-mirror device.

As mentioned, data transmission can take place by modulation of the laser beam. To detect this data, a sensing means is located behind the centre of the triple mirror device which has a central axial window transmitting the laser beam to the sensing means. Preferably a undimensional optical processor is disposed to receive light passing through said window and further sensing means is provided to indicate the angular entry direction of the light.

The invention provides a self-contained unit usable, inter alia, in the system and comprising a laser, an optical system, a beam splitter orientated to re-direct a beam from the laser through the optical system, a lens system with a central window on the axis of the optical system through which the laser beam is emitted and a symmetrical array of lenses around the window with optical axes parallel to that of the optical system and sensing means for receiving reflected light from the array of lenses to indicate whether a reflected beam entering the array is parallel to the emitted beam.

The invention also provides a uni-dimensional optical processor for use in determining one of two orthogonal angles of incidence of a light beam on a plane surface; said processor comprising a light transmitter for passing light from the plane surface to another optical surface, optical means for eliminating the influence of the other of the angles of incidence on the distribution of light at said optical surface and linear photo-electric means which collects light from said optical surface and provides a signal indicative of the distribution and of the one angle.

The invention may be understood more readily, and various other features and aspects of the invention may become apparent, from consideration of the following description.

BRIEF DESCRIPTION OF DRAWINGS

Embodiments of the invention will now be described, by way of example only, with reference to the accompanying drawings, wherein.

DESCRIPTION OF PREFERRED EMBODIMENTS

Figure 1:
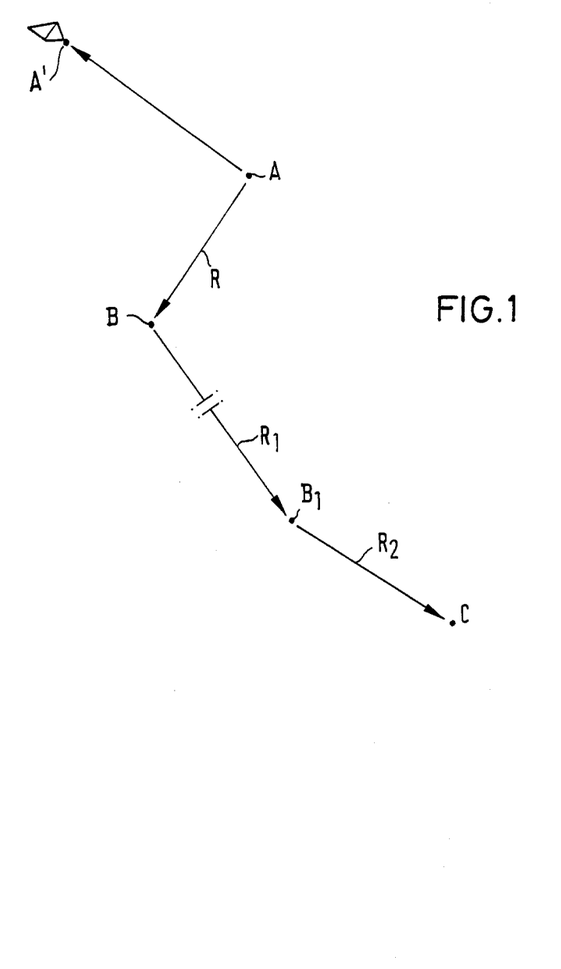
FIG. 1 is a diagrammatic representation of a measuring method in accordance with the invention.
Figure 2:
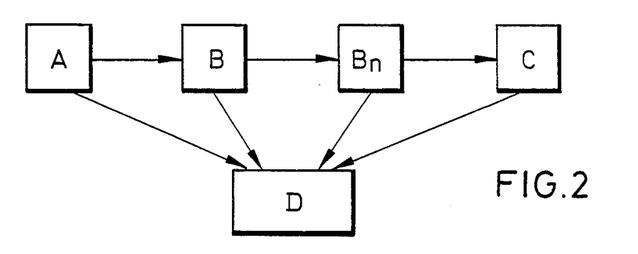
FIGS. 2, 2a and 2b are block schematic diagrams of systems in accordance with the invention.
Figure 2A:
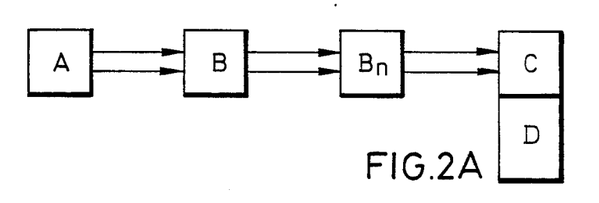
Figure 2B:
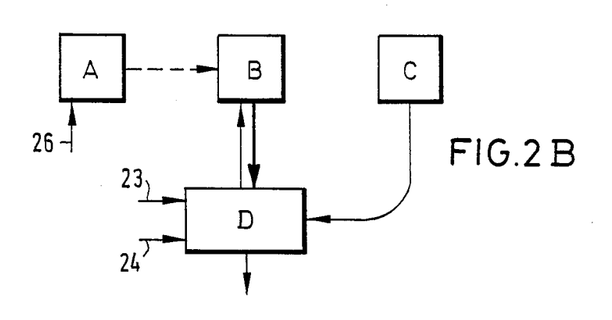

FIG. 1 depicts points A', A, B, B', C with vectors interconnecting these points representative of the method according to the invention. Point A is a fixed reference of which the three dimensions defining the co-ordinates of the point A are known and point C depicts a point of which the measuring co-ordinates defining its three-dimensional poisition are to be ascertained. Between these points A and C there are intermediate points B, B'. Point B is connected by a vector R representing a direct line of communication to point A. Point B' is connected to point B by way of a vector R1 again representing a direct line of communication and point C is connected to point B1 by way of a vector R2 again representing a direct line of communication. The intermediate points B and B' are necessary only if it is not possible to have a direct line of communication and, in general, any number of intermediate stations B–Bn can be provided between points A and C. The vectors R, R1, R2 represent polygonal sides of a surveying technique used to locate the position of point C and have measured lengths. A further reference point A' is shown from which it is possible to initially define the co-ordinates of point A. The end point C is movable in three-dimensions and can, for example, be a tunnel driving machine, a drive shield or any movable equipment, the position of which it is to be ascertained. The fixed auxiliary reference point A' can be defined geoditically by mine-survey methods and is checked periodically from time to time in order to precisely define the position of point A. As appears hereinafter the points A, B, B1 and C can be linked during use, for example, by laser light beams which additionally allow unidirectional transmission of data from the station A to the next measuring station and so on as indicated by the arrows on the vector R, R1, R2. Each measuring point, embodied in the invention as a measuring station, employs a computer which provides data for evaluation by a central computer D. Various arrangements are shown in FIGS. 2, 2a and 2b. In the arrangement shown in FIG. 2, data provided by computers in the individual measuring stations A, B, Bn and C is fed directly through a transfer link to the computer D which ascertains from all the data received the spatial co-ordinates of station C. Data also passes from one station to the next. In FIG. 2A the data provided by the individual stations A, B, Bn and C is fed along the laser beam paths interconnecting the stations in succession from one station to the next and only the final station C provides collective data to the computer D. The arrangement shown in FIG. 2B is a combination of the hierarchical structures shown in FIGS. 2a and 2 where the data provided by station A is fed by the laser beam path to the station B and thence via a data transfer link e.g. a cable to the computer D whereas station C is only connected to the computer D via such a data transfer link. The data information provided in those systems represents the co-ordinates and distances between the points A, B, Bn, C and at each point in the traverse measurements data is available to enable the true spatial co-ordinates of the point to be calculated.

Each communication link shown in FIG. 1 as the vectors R etc is represented by a laser at one end and a triple-mirror device at the other end as described hereinafter. The surveying and ascertaining of the bearing of each triple-mirror device is also effected automatically as explained in further detail hereinafter. The three-dimensional data describing the positions of the measuring stations is based on the polar-co-ordinate system wherein the lengths R, R1, R2 of the vectors and two angles are sufficient in each case. However, the co-ordinates of the various points can be converted from one to another if the position of one of the points is known in relation to the other since the co-ordinates of the various points can be converted by the description of three angles which describe the position of the axes of the two points relative to one another. The transformation of the co-ordinates from one point into another is then effected in known manner by tensor operation with co-ordinate transformation in three-dimensions unambiguously defined by six linear independent variables.

In the method according to the invention the relative positions of the points A, B and C are determined in succession and from the relative co-ordinates of the point C are determined the absolute space co-ordinates in relation to the known reference A. The actual measurement of the co-ordinates is effected by the use of angle-measuring instruments in the stations and by measurement of the lengths of the vectors joining the stations. In general, the measurement of the angles between an incoming laser beam and an emerging laser beam is effected by the use of angle coders, angles in relation to the horizontal are measured by inclinometers and the lengths of the vectors R, R1 etc are determined by laser distance measurement. In all cases the measurement sections of vectors are defined by a laser beam which is reflected back to its starting point and the laser producing the beam which is reflected is controlled by the station computer in position.

Figure 3:
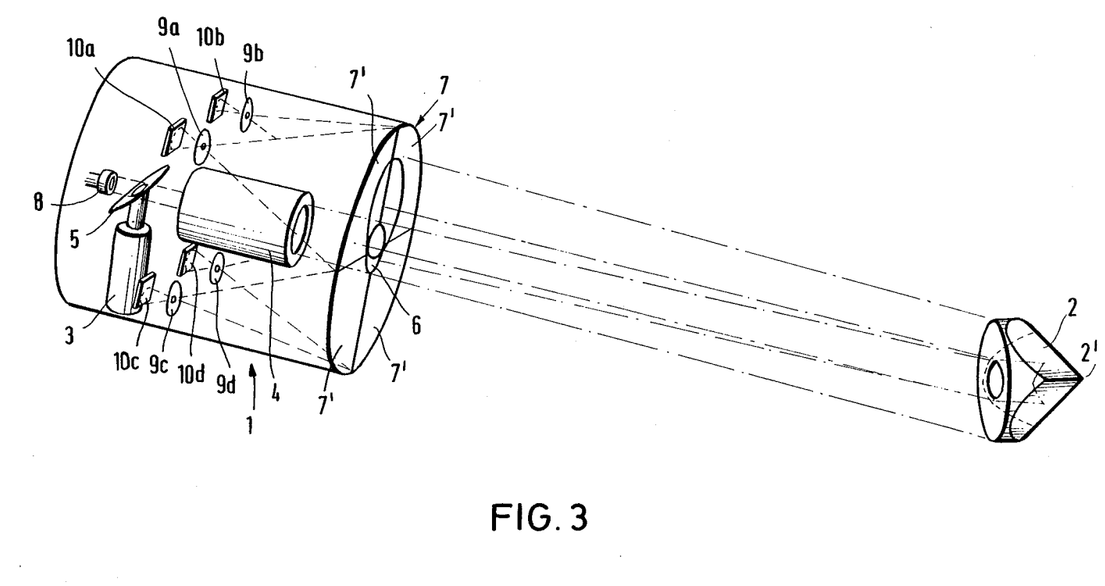
FIG. 3 depicts devices used in the system.
Figure 4:
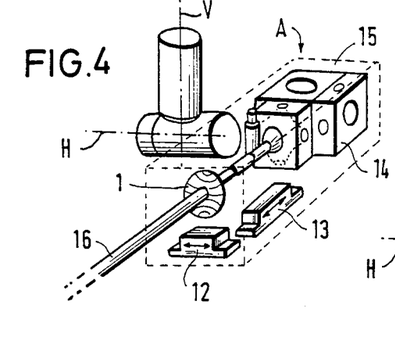
FIGS. 4 to 8 depict various measuring stations for use in the systems.

FIG. 3 represents the relevant devices for use over one measuring section of the system. As shown in FIG. 3, a cylindrical housing unit 1 contains a laser 3 and serves to ascertain the three dimensional position of a triple-mirror device 2 and to this end the unit 1 emits a laser beam which is transmitted from the unit 1 to the mirror device 2 and is reflected back to the unit 1. When the laser beam is orientated centrally of the device 2, the reflected beam has at least a major component parallel to the original beam. The reflected light is detected in the unit 1 and is used not only to signify the alignment of the laser beam vis a vis the device 2 but also to ascertain the distance from the unit 1 to the centre of the mirror device 2. The mirror device 2 can be of such design and dimensions to be suitable for a circular light beam of about 10 to 15 mm in diameter. A light transmitting central region of the device 2 forms a window 2'. When the light beam from the unit 1 is made to scan or sweep over the mirror device 2 the reflected beam returns at an angle until the position of the reflected beam is parallel to the original beam signifying that the centre of the device 2 has been located. Thus by ascertaining the movement of the unit 1 to achieve the parallelism of the reflected beam from the mirror device 2 a precise measurement of the location co-ordinates of the mirror device 2 can be made. Once the position of the mirror device 2 has been ascertained by the scanning operation, the transit time of the beam from the unit 1 and back to the unit 1 is ascertained in order to determine the distance of the device 2 from the unit 1. The angular displacement of the unit 1 to locate the centre of the device 2 and the distance then defines the position of the device 2 in relation to the unit 1 and hence the vector R, R1, R2 in polar co-ordinates. A mirror device 2 is located at each of the stations B+Bn and C and operates in conjunction with a unit 1 which is located in each of the stations A, B-Bn. The unit 1 is a self-contained unit positionally adjustable in relation to the associated mirror device 2. As shown, the unit 1 has its laser 3 orientated transversally to the main light path. A beam splitter 5, such as semi-transparent plane mirror, re-directs the light emitted by the laser 3 into an optical system 4 which provides some divergence creating a wider beam emanating from a window 6 defined by a lens system 7 at one end of the unit 1. The system 4 may be composed of several lenses with an intermediate filter or window. The collimated beam passes to the mirror device 2 and is then deflected over various paths by virtue of reflecting surfaces of the device 2 back to the unit 1. The part of the reflected beam which returns centrally of the lens system 7, that is within the window 6 emanating from the centre of the device 2, is converged by the optical system 4 and returns via the beam splitter 5 to be focussed with an additional lens (not shown) onto a photo detector 8 with a fast response. Means is provided to assess the time interval between the initial beam and the reflected beam detected by the sensor 8 in order to ascertain the distance of the device 2 from the unit 1, that is to assess the length of the vector R, R1, R2. Any part of the reflected beam which impinges on the lens system 7 outside of the window 6 is assessed separately. The lens system 7 around the window 6 is symmetrical and composed of two or more, preferably four, Fresnel lenses 7', the optical axes of which extend parallel to the central optical axis defined by the optical system 4. Two or more, preferably four, three-dimensional filters 9a to 9d, such as slits or orifices, are located in the focal planes of the lenses 7' to pass light parallel to the main axis of the system 4. This arrangement makes it possible to provide a unit 1 of moderate overall length since the optical paths between the lenses 7' and the filters 9a to 9d are outside of the optical system 4. Each of the filters 9a to 9d is associated with a sensor 10a to 10d which provides signals collectively indicative of the proportion of reflected light passing through the associated quadrants defined by the lenses 7'. When the unit 1 is brought into alignment with centre of the mirror device 2 the sensors 10a to 10d will provide signals of the same intensity and by moving the unit 1 in accordance with the actual signals produced by the sensors 10a to 10d and/or under a control sequence determined by the local computer to bring about this equality, the position of the mirror device 2 can be ascertained with precision. Once alignment has been established the intensity of light received by the sensor 8 is maximized and the distance measurement is best carried out under these conditions. The laser beam provided by the unit 1 can be also be modulated in known manner to transmit information, for example, as to the dynamic position of the unit 1. Once the correct alignment has been established the angular movement of the unit 1 signifies the measured co-ordinates of the device 2 which is under investigation. The transmitted data can be received by a sensor 11 (FIGS. 6, 7 and 8) positioned at the rear of the centre window 2' of the device 2.

The unit 1 itself is particularly compact and the various lenses have a relatively short focal length. Adjustment of the laser 3 can be effected by displacement of the beam splitter 5. A robust semi-conductor laser is especially suitable for use in the unit since its output is readily modulated for data transmission and distance measurements.

The sensor 11 provided behind the mirror device 2 (FIGS. 6, 7 and 8) receives the portion of the incoming light beam which pass through the central window 2' of the mirror device 2 as shown in FIG. 3. The sensor 11 can thus also indicate whether the mirror device 2 has received and reflected the original beam. This in turn indicates that a proper transmission path exists between the unit 1 and the mirror device 2, regardless of alignment. Should an obstacle obstruct the light beam, the sensor 11 will not produce a signal and so long as the sensor 11 produces a signal this signifies the sensor 11 is enabled to respond to information transmitted by the beam. Should the laser beam be interrupted the associated sensor 11 may induce the laser 3 to cease operation or to reduce its intensity for safety.

Figure 5:
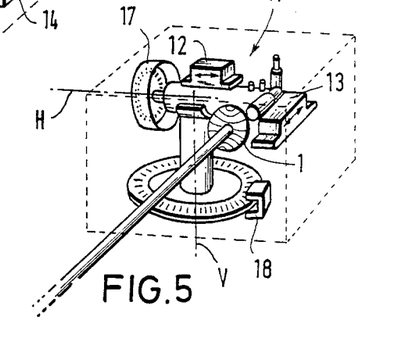

FIGS. 4 to 8 depict possible constructional arrangements for each of the stations A, B–Bn and C, respectively. Thus the station A shown in FIG. 4 employs the unit 1 described above in connection with FIG. 3 and is suspended for motion about two axes, a horizontal axis H and a vertical axis V. The seeking-out of the mirror device 2 at the associated station B is effected by moving the station A about these axis V, H by means of a suitable drive system. The co-ordinates of the mirror device 2 at the station B can then be transmitted through the laser beam passing between the stations A and B as described, see FIGS. 2A and 2B or to the central computer D (FIG. 2). The station A also employs a precision longitudinal inclination indicator 13, a transverse inclination indicator 12 and a magnetic/north-seeking navigational instrument such as a gyrocompass 14. Instead of the instrument 21 it is also possible to use precision angle coders. All the components are combined together with the drive system and the station computer (not shown) and the unit 1 as one constructional assembly 15 constituting the station A movable about the axes H and V. The laser beam emitted from the station A is designated 16. The indicators 12, 13 determine the inclination of the station A while the instrument 14 determines the angle between the north-south magnetic earth axis and the station A. The initial reference co-ordinates of the station A itself can be ascertained by again using a mirror device 2 in a known position (A' in FIG. 1) by locating the station A in the manner described in relation to this mirror device 2 at A' and ascertaining the readings provided by the indicators 12, 13 and the instrument 14. The instrument 14 can be replaced by the angle coders 17, 18 as shown in FIG. 5. In this case the position of the station A can be ascertained by taking a bearing on the mirror device 2 in the known position A' and setting up the corresponding zero reference data on the coders 17, 18 for the axes H and V. The other angle data is provided by the indicators 12, 13. Once the station A has been set up, the position of the mirror device 2 at the station B is determined together with the distance between the stations A and B by scanning with the laser beam to locate the centre of the device 2.

Figures 6, 7:
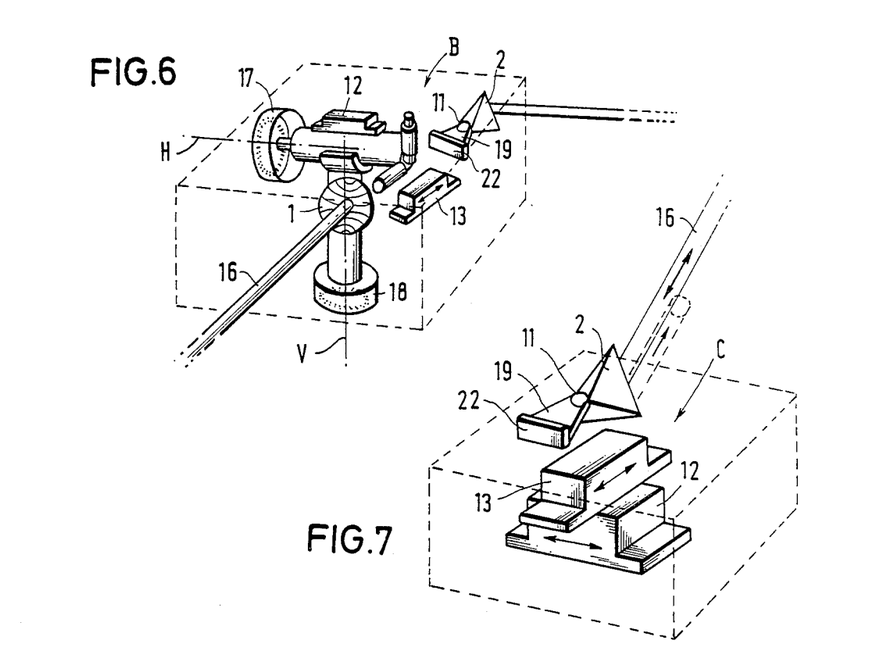
Figure 8:
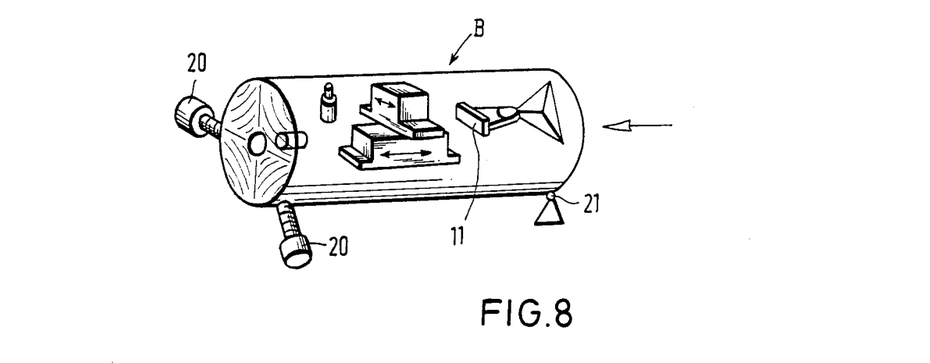

The station B is shown in FIG. 6 to be composed of the unit 1, the mirror device 2 having the detector 19 together with another optical device 19 and a further sensor 22, described hereinafter, a longitudinal inclination indicator 13, a transverse inclination indicator 12 and angle coders 17, 18. As with station A, the station B employs a drive system (not shown) for moving the station B about the vertical and horizontal axes V and H and a computer (not shown). The laser beam emitted by station B is again designated 11. The horizontal axis angle coder 17 and the vertical axis angle coder 18 determines the movement of the station B about these axes H and V. Further angle coders can be provided to increase the accuracy where relatively large longitudinal/transverse inclinations occur. These additional coders (not shown) would be set to zero in accordance with the inclinometers 12, 13. These various components are again united in one constructional assembly mounted for controlled movement about the two axes H and V. Instead of having the intermediate station B rotatable about the two axes H and V as shown in FIG. 6 an alternative shown in FIG. 8 is to have the station B vertically and horizontally rotatable about one pivot point 21 in which case two adjustment screws 20 or the like are provided to pivot the station. The co-ordinates of the station B defining its position would be ascertained by reference to the laser beam passed to the station B from the station A back again by way of its mirror device 2. The direction of the laser beam emitted by the unit 1 of the station B in seeking out the mirror device 2 of the next station Bn or C is determined by means of the indicators 12, 13 and coders 17, 18 and the devices 19, 22. The station B would be positionally defined by the station A seeking out its mirror device 2 and information describing its position would be transmitted to the station B via the laser beam 16 from the station A (FIGS. 2A and 2B) or to the computer D (FIG. 2). The station B then seeks out the mirror device 2 in the next station Bn or C and passes information to this station C describing its position by way of its emitted laser beam or otherwise as in FIGS. 2, 2A and 2B.

The last station C is shown in FIG. 7 is composed of a triple-mirror device 2, with an associated optical device 19 and sensors 11, 22, a longitudinal inclination indicator 13 and a transverse inclination indicator 12 and a computer (not shown). Again, all these components are combined in one constructional assembly constituting the station C. The station C is best rigidly fixed to some appliance the position of which is to be monitored and/or controlled.

Figure 9:
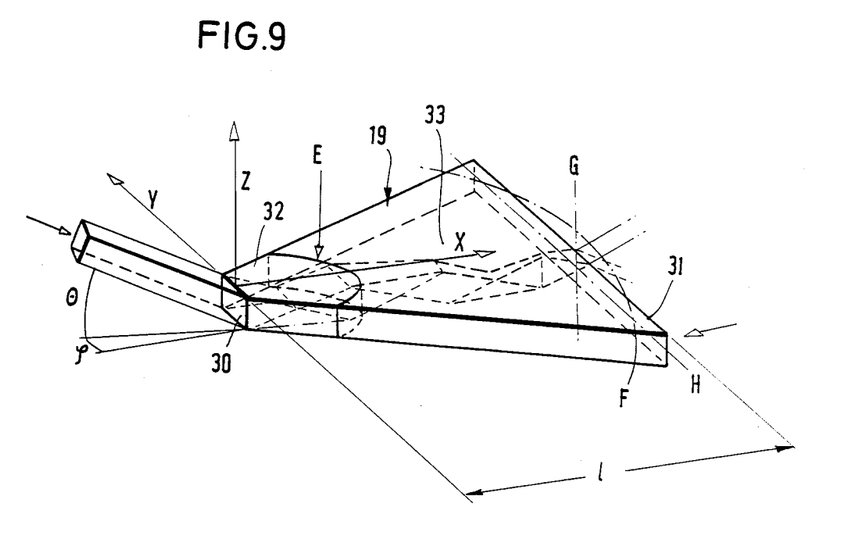
FIG. 9 depicts further devices for use in some of the measuring stations.

FIG. 9 depicts the optical device 19 associated with the mirror device 2 in the stations B–Bn and C. The device 19 and its sensor 22 functions as a undimensional optical processor. The device 19 is composed of a thin prismatic block which serves to collect light reaching the rear corner of the device 2 by way of its central window 2' (FIG. 3). In the stations B– Bn, C the horizontal angle $\rho$ between the incoming laser beam and the device 2 is determined by the sensor 22 while the vertical angle $\theta$ is of no interest. The optical device 19 serves to eliminate or mitigate the effect of angle $\theta$ while enabling the angle $\rho$ to be measured by the sensor 22 which is a linear charge-coupled photo-electric array, such as 'Vidikon'. The optical processor 19, 22 ideally provides a resolution of 4000×4000 points but an array of 4096 photo-electrical cells may suffice. The block of triangular or trapezoidal shape is constructed from optically transparent glass and has planar upper and lower parallel faces. The narrow planar end face 30 of the block receives the incoming light as shown at various angles. The opposite larger planar end face forms a two-dimensional light conductor and receives light trapped in the block due to multiple total internal reflections. The block is itself composed of two components 32, 33 of different refractive powers which are joined by a curvilinear face E. Parallel light beams of different co-ordinates Y striking the face 30 meet on a focal line H extending transversally over about the width of the rear face of components 33 which forms an exit window 31.

Light beams with different co-ordinates Z and different angles $\theta$ are transported by total reflections to the exit window 31. Thus a bundle of parallel rays will impinge along a line G, the locus of the line G in the Y-direction depending upon $\theta$ and $\rho$ according to Snellius's law of refraction applied to the entry window 30. For a small $\theta$ this locus is dependent only upon $\rho$. The limit surface E, as shown, can be formed at least approximately by a cylinderical surface. Then the focal line H describes a circle F. The linear photo-electric array or detector 22 (FIGS. 6 and 7) mounted along the focal line H provides the relevant intensity distribution along the line H and from this the computer can determine the angle $\rho$ of an incoming light beam by, for example, reference to a curve of intensity distribution depedence upon the angle $\rho$. The detector 22 must be sensitive on both sides of the plane of symmetry perpendicularly to the vertical Z axis. From geometrical considerations it results that, in dependence upon the distance from the entry window 30 to the exit window 31, the angle $\theta$ and the angle $\rho$ by reason of the optical path in the block 32, 33, the intensity can disappear on the one side of this plane at the locus of the detector 22. If the entering light beam possesses a diameter in the order of magnitude of the thickness of the glass block 32, 33, then taking into consideration the limit angles, the distribution of the re-emerging light intensity depends only upon the angle $\rho$. The point of impingement of the light beam upon the entry window 30 is eliminated, as regards its effect upon the locus of the light maximum, because of the cylindrical lens E which is generated by the curved surface of the two blocks 32, 33 of different refractive powers. In operation the output of the detector 22 is read out continuously by the pertinent station computer which determines, from the intensity distribution curve, the locus of the laser light. Different combinations of glass types, for example, crown glass BK1 and heavy flint glass SF6, can be used for the components 32, 33.

As set forth above, in operation the geometrical locus of the point C is surveyed under computer control from the reference point A by way of a traverse, the vectors of which are fixed by laser paths, in that the relative position of the co-ordinate systems of the individual polygon points are determined successively and the co-ordinates of the point C are calculated from the relative co-ordinates, in relation to the reference system, by means of the central computer D. From the starting point in each case of a polygon side of the traverse here the laser measurement unit 1 controlled by the computer pertaining to the station is moved so that it finds and locates the triple mirror device 2 at the end of the measurement section. At least part of the laser beam issuing from the laser measurement unit is reflected back on itself with the aid of the triple mirror device 2 while a part of the laser beam is used for the measurement of the angle $\rho$ of the entering beam. The parallel offset of the laser light reflected by the triple mirror device 2 serves to regulate the positioning of the laser beam, from which it is possible to deduce the angular position of the located triple mirror device 2. The length of the measurement section is obtained, as mentioned, by means of a transit time measurement of the laser beam. As mentioned, the uni-dimensional optical processor 19, 22 serves for the measurement of the angles between the local co-ordinate system and the entering laser beam at the polygon point B–Bn and C. Any information as to the location of the triple mirror device 2 of the measurement station B (seen from A) imposed by means of modulation upon the laser beam in the measurement station A is taken from the laser beam and forwarded to the computer pertaining to the measurement station B–Bn or the information is given directly to the central computer D. A semi-conductor laser is preferred since it is readily modulated for the length measurement (by means of transit time or phase difference measurements) and if necessary for data transmission. The optical system 4 arranged in the laser measurement unit 1 expediently consists of a multi-lens system with or without intermediate focus and with or without three-dimensional filters (to reduce divergence). The beam splitter 5 operates in the reflected mode for the emitted beam while the beam reflected back by the triple mirror device 2 is usually initially displaced parallel to the optical axis of the beam splitter 5. Adjustment is unnecessary by reason of the spatial arrangement of photosensors and the laser focus. It is ensured that after alignment and zero regulation of the triple mirror device 2 the data transmission functions by way of the laser path, since then the laser beam will reliably strike the window 2' at the centre of the triple mirror device 2. With the laser measurement unit 1 constructed as described, in a rotation-symmetrical manner, a particularly compact and versatile assembly results. Micro-computers can expediently be used for the computers at the measurement stations A, B–Bn and C and for the central computer D. The computer of the measurement station A directs its laser beam on to the triple mirror device of the measurement station B, and readjusts any deviations caused by movement of the measurement station B. Moreover the computer in A reads out the instruments. On demand the computer can fix a given point and take it as reference point for further computations. The computer of the measurement station A forwards its measured values, e.g. by way of the laser section A–B to the computer of the measurement station B.

The computer of the measurement station B has the task of directing the laser situated here on to the triple mirror device of the next measurement station Bn–C and of adjusting it and of determining the location of the laser beam, arriving from the measurement station A in the uni-dimensional optical processor. Furthermore the computer of the measurement station B reads out the instruments and transmits any data communicated from the measurement station A by way of the laser communication path, also the data collected in the measurement station B, to the central computer D (FIG. 2B).

In the final measurement station C a computer, consisting of a relatively small micro-computer, takes over the preparation of the data and their transference to the central computer D. The preparation of the data consists in the localisation of the light point in the optical processor and the evaluation of the angle measuring instrument or instruments.

The central computer D takes in all the data and evaluates and calculates the co-ordinates of the measured point C in relation to a fixedly pre-determined point A or A'.

The computer of the measurement station A preferably comprises a command unit with a keyboard and a display in which the current status of the A-computer is visible. With the aid of the keyboard the measurement station A can be caused to find the bearing of a fixed point A' (by way of a triple mirror device) and to communicate the co-ordinates pertaining thereto to the central computer D by way of the computer of the measurement station B. Furthermore, with the aid of the keyboard a repetition of the bearing-finding and measuring operation can be initiated, the measurement station A can be brought into a defined condition (reset) and the laser beam can be switched on and off. The display gives the user information as to whether the measurement station A is functioning normally and whether it has found the bearing of the triple mirror device of the measurement station B.

The uni-dimensional optical processor described above in connection with FIG. 9 could also be realised with variation of refractive index in the ray path with a pair of parallel-mounted mirrors, the mirror-coated surfaces of which face one another, a small air gap of, for example, 2 mm, being provided between the two mirrors. At the entry site of the light beam a fixedly mounted slot orifice would be provided the slot of which extends parallel to a normal to the surfaces of the mirrors. In the case of this arrangement the horizontal location of the entering, extended light beam is defined by the slot orifice. The light beam passing between the mirrors is directed by the two parallel mirrors onto the linear photo-receiver. Since refraction occurs at no point of the ray path, a variation of the angle $\theta$ cannot affect the measurement function.

The optical processor according to the invention is accordingly based upon the basic idea of combining an optical system, which eliminates the dependence of the incident light beam upon the locus in one direction (slot orifice or cylinder lens) with a two-dimensional light conductor component which fixes the locus of the beam in one direction and permits its variation in the direction perpendicular thereto (parallel mirrors or plane-parallel glass plate). In this case the linear photo-detector for the measurement of the angle of the incident light beam in the desired direction is provided in the ray path behind this two-dimensional light conductor component.

We claim:

1. A unit for use in a positional determination system; said unit comprising a laser, an optical system, a beam splitter orientated to re-direct a beam from the laser through the optical system, a lens system with a central window on the axis of the optical system through which the laser beam is emitted and a symmetrical array of lenses around the window with optical axes parallel to that of the optical system and sensing means for receiving reflected light from the array of lenses to indicate whether a reflected beam entering the array is parallel to the emitted beam.

2. A unit according to claim 1, wherein the array of lenses are Fesnel lenses.

3. A unit according to claim 1, wherein three-dimensional filters are interposed between the lenses of the array and photo-electric device constituting the sensing means.

4. A unit according to claim 1, and further comprising photo-electric detector means on the axis of the optical system for receiving the reflected beam passed through the beam splitter and for providing a signal usable to determine the transmit time between the emitted and reflected beams to determine the distance of reflective means creating the reflected beam.

5. A uni-dimensional optical processor for use in determining one of two orthogonal angles of incidence of a light beam on a plane surface; said processor comprising a light transmitter for passing light from the plane surface to another optical surface, optical means for eliminating the influence of the other of the angles of incidence on the distribution of light at said optical surface and linear photo-electric means which collects light from said optical surface and provides a signal indicative of the distribution and of the one angle.

6. A processor according to claim 5, wherein the light transmitter is a transparent prismatic glass block with a narrow end face forming the plane surface, the block being composed of components of different refractive powers which join at a surface providing a cyindrical lens defining a focal line across a wider end face opposite the narrow end face with the photo-electric means orientated parallel to said line.

7. A method of determining the position of an object remote from a reference station (A) at a predetermined position by survey measurements effected on computer controlled laser generated light beams representing measurement vectors (R, R1, R2) extending between the reference station and further measurement stations (B, B1, C) representing polygonal points; said method comprising the steps of:
(a) emitting a first laser light beam from the reference station, displacing said first beam udner computer control while detecting a reflection of the first beam from a first measurement station (B) until coincidence occurs, ascertaining from angular displacement relationships necessary to achieve coincidence the spatial co-ordinates of the first measurement station relative to the reference station, ascertaining from a measurement of the transit time of the first beam and its reflection the distance between the first measurement station and the reference station;
(b) emitting a second laser light beam from the first measurement station, displacing said second beam under computer control while detecting a reflection of the second beam from a second measurement station (C) positionally associated with the object until coincidence occurs, ascertaining from angular displacement relationships necessary to achieve coincidence the spatial co-ordinates of the second measurement station relative to the first measurement station, ascertaining from a measurement of the transit time of the second beam and its reflection the distance between the first and second measurement stations; and
(c) transferring resultant measurement data via at least one of the beams and collecting and assessing all the measurement data to evaluate the position of the object.

8. A method of determining the position of an object remote from a reference station (A) by survey measurements effected on computer controlled laser generated light beams representing measurement vectors (R, R1, R2) extending between the reference station and further measurement stations (A1, C) representing polygonal points; said method comprising the steps of:
(a) emitting a first laser light beam from the reference station, displacing said first beam under computer control while detecting a reflection of the first beam from a first measurement station (A1) of known location until coincidence occurs, ascertaining from angular displacement relationships necessary to achieve coincidence the spatial co-ordinates of the reference station relative to the first measurement station, ascertaining from a measurement of the transit time of the first beam and its reflection the distance between the first measurement station and the reference station;
(b) emitting a second laser light beam from the reference station, displacing said second beam under computer control while detecting a reflection of the second beam from a second measurement station (C) positionally associated with the object until coincidence occurs, ascertaining from angular displacement relationships necessary to achieve coincidence the spatial co-ordinates of the second measurement station relative to the reference station, ascertaining from a measurement of the transit time of the second beam and its reflection the distance between the reference and second measurement stations; and (c) transferring resultant measurement data via at least one of the beams and collecting and assessing all the measurement data to evaluate the position of the object.

9. A method of determining the position of an object remote from a reference station (A) by survey measurements effected on computer controlled laser generated light beams representing measurement vectors (R, R1, R2) extending between the reference station and further measurement stations (A1, B, C) representing polygonal points; said method comprising the steps of:

(a) emitting a first laser light beam from the reference station, displacing said first beam under computer control while detecting a reflection of the first beam from a first measurement station (A1) of known location until coincidence occurs, ascertaining from angular displacement relationships necessary to achieve coincidence the spatial co-ordinates of the reference station relative to the first measurement station, ascertaining from a measurement of the transit time of the first beam and its reflection the distance between the first measurement station and the reference station;

(b) emitting a second laser light beam from a second measurement station (B), displacing said second beam under computer control while detecting a reflection of the second beam from a further measurement station (C) positionally associated with the object until coincidence occurs, ascertaining from angular displacement relationships necessary to achieve coincidence the spatial co-ordinates of the further measurement station relative to the second measurement station, ascertaining from a measurement of the transit time of the second beam and its reflection the distance between the second and further measurement stations.

(c) emitting a third laser light beam from the reference station, displacing said third beam under computer control while detecting a reflection of the third beam from the second measurement station (B) until coincidence occurs, ascertaining from angular displacement relationships the spatial co-ordinates of the second measurement station relative to the reference station, ascertaining from a measurement of the transit time of the third beam and its reflection the distance between the second measurement station and the reference station; and (d) transferring resultant measurement data via at least some of the beams and collecting and assessing all the measurement data with a central computer to evaluate the position of the object.

10. A system for determining the position of an object, said system comprising:

(a) a reference station (A) at a predeterminable position;

(b) a first measurement station (A1) at a known location;

(c) a second measurement station (C) positionally associated with the object;

(d) means (1) for successively emitting a laser light beam from the reference station to the first measurement station and the second measurement station;

(e) means (2) at the first and second measurement stations for reflecting said beam when incident;

(f) computer-controlled means (15) at the reference station for displacing said beam;

(g) means (10, 7) at the reference station for detecting the reflection of the beam from the first measurement station until coincidence occurs, for ascertaining from angular displacement relationships to achieve coincidence the spatial co-ordinates of the reference station relative to the first measurement station and from a measurement of the transit time of the beam and its reflection the distance between the first measurement station and the reference station, for detecting the reflection of the beam from the second measurement station until coincidence occurs, and for ascertaining from angular displacement relationships to achieve coincidence the spatial co-ordinates of the second measurement station relative to the reference station and from the transit time of the beam and its reflection the distance between the reference and second measurement stations;

(h) means for transferring and receiving measurement data between the stations and via at least one of the beams; and (i) computer means (D) for collecting an assessing all the measurement data to evaluate the position of the object.

11. A system for determining the position of an object, said system comprising:

(a) a reference station (A) at a predeterminable position;

(b) a first measurement station (A1) at a known location;

(c) a second measurement station (C) positionally associated with the object;

(d) a further measurement station (B) intermediate the reference and second measurement stations;

(e) means (1) for succesively emitting a laser light beam from the reference station to the first measurement station and the further measurement station;

(f) means (2) at the first and further measurement stations for reflecting said beam when incident back to the reference station;

(g) computer-controlled means (15) at the reference station for displacing said beam;

(h) means (10, 7) at the reference station for detecting the reflection of the beam from the first measurement station until coincidence occurs, for ascertaining from angular displacement relationships necessary to achieve coincidence the spatial coordinates of the reference station relative to the first measurement station and from a measurement of the transit time of the beam and its reflection the distance between the first measurement station and the reference station, for detecting the reflection of the beam from the further measurement station until coincidence occurs, and for ascertaining from angular displacement relationships necessary to achieve coincidence the spatial co-ordinates of the further measurement station relative to the reference station and from the transit time of the beam and its reflection the distance between the reference and further measurement stations;

(i) means for emitting a further laser light beam from the further measurement station (B);

(j) means (2) at the second measurement station (C) for reflecting said further beam when incident back to the further measurement station;

(k) computer-controlled means (15) at the further measurement station for displacing said further beam;

(l) means (10, 7) at the further measurement station for detecting the reflection of the further beam from the second measurement station until coincidence occurs, for ascertaining from angular displacement relationships necessary to achieve coincidence the spatial co-ordinates of the second measurement station relative to the further measurement station and from a measurement of the transit time of the beam and its reflection the distance between the further measurement station and the second measurement station;

(m) means for transferring and receiving measurement data between the stations and via at least one of the beams; and (n) computer means (D) for collecting and assessing all the measurement data to evaluate the position of the object.

12. A system according to claim 10, wherein the reference station is composed of a unit mounted for movement in both horizontal and vertical senses, the displacement means serves to move said reference station in both the horizontal and vertical senses until the reflected beam coincides with the emitted beam, and angle measuring instruments serve to ascertain the relative movements of the reference station necessary to achieve coincidence.

13. A system according to claim 10, wherein the means for transferring and receiving measurement data modulates and demodulates said at least one beam.

14. A system according to claim 10, wherein each reflecting means is a triple-mirror device.

15. A system according to claim 10, wherein the reference station further comprises an optical system with a central window (6) through which the laser beam is emitted, the detecting means includes a symmetrical array of lenses (7') around the window, and further comprises means to sense the occurrence of equal intensities of reflected light entering the lenses to signify that the reflected beam is predominantly coincident with the emitted beam.

16. A system according to claim 15, wherein the lenses forming the symmetrical array are Fresnel lenses.

17. A system according to claim 15, wherein there is further provided a beam splitter (5) for re-directing the laser beam through the optical system which causes the beam to pass through the window and there is provided another sensing means (8) for sensing reflected light parallel to the emitted beam passed back through the beam splitter, and means operably associated with the other sensing means for evaluating the transit time of the emitted beam and its reflection to ascertain distance.

18. A system according to claim 10, wherein the reflecting means is a triple-mirror device which employs a central light transmitting window (2'), and data receiving means is provided to receive light passed through said window.

19. A system according to claim 18, wherein a unidimensional optical processor is disposed to receive light passing through said window, and sensing means is provided to indicate the angular direction of the light beam received by the mirror device.

20. A system according to claim 10, wherein the reference station employs a gyro compass and anglecoders for detecting displacement of the station about horizontal and vertical axes.

21. A system according to claim 10, wherein at least the reference station has its own computer providing data signifying co-ordinates of the relative positions of the stations, and the computer means is a central computer which receives the measurement data automatically and continuously to evaluate the position of the object.

22. A method according to claim 7 and further comprising detecting the angle of incidence of the first and second laser beams at the first and second measurement stations and utilizing this information in the position determination process.

23. A method according to claim 8 and further comprising detecting the angle of incidence of the second laser beam at the second measurement station and utilizing this information in the position determining process.

24. A system according to claim 10 and further comprising means at the second measurement station for detecting the angle of incidence of the laser beam from the reference station.

25. A method according to claim 9 and further comprising detecting the angle of incidence of the second and third laser beams at the further and second measurement stations and utilizing this information in the position determining process.

26. A system according to claim 11 and further comprising means at each of the second and further measurement stations for detecting the angle of incidence of said beam and said further beam.

* * * * *